US007101517B2

(12) United States Patent
Nakagawa et al.

(10) Patent No.: US 7,101,517 B2
(45) Date of Patent: Sep. 5, 2006

(54) PROCESSING SOLUTION PREPARATION AND SUPPLY METHOD AND APPARATUS

(75) Inventors: Toshimoto Nakagawa, Kawasaki (JP); Yuko Katagiri, Kawasaki (JP); Shu Ogawa, Tokyo (JP); Yasuyuki Kobayakawa, Tokyo (JP); Makoto Kikukawa, Yokohama (JP); Yutaka Saito, Tatsuno (JP); Yoshitaka Nishijima, Tatsuno (JP)

(73) Assignees: Nagase & Co., Ltd., Osaka (JP); Hirama Laboratories Co., Ltd., Kanagawa (JP); Nagase CMS Technology Co., Ltd., Tokyo (JP)

( * ) Notice: Subject to any disclaimer, the term of this patent is extended or adjusted under 35 U.S.C. 154(b) by 246 days.

(21) Appl. No.: 10/342,769

(22) Filed: Jan. 15, 2003

(65) Prior Publication Data

US 2003/0136763 A1 Jul. 24, 2003

(30) Foreign Application Priority Data

Jan. 16, 2002 (JP) ............................ P2002-007600

(51) Int. Cl.
 *B01J 19/08* (2006.01)
(52) U.S. Cl. ................................. 422/186.05
(58) Field of Classification Search ........... 422/186.05, 422/186.06; 29/25.01, 25.02
 See application file for complete search history.

(56) References Cited

U.S. PATENT DOCUMENTS 4,980,017 A * 12/1990 Kaji et al. ..................... 216/93
5,730,162 A * 3/1998 Shindo et al. ................. 134/66
5,759,971 A * 6/1998 Manako ...................... 510/175
5,874,049 A 2/1999 Ferri, Jr. et al. ............. 422/106
5,924,794 A 7/1999 O'Dougherty et al.
6,228,823 B1 * 5/2001 Morinaga et al. ........... 510/175

FOREIGN PATENT DOCUMENTS

JP 08-283976 10/1996

OTHER PUBLICATIONS

Japanese Patent Application No. 91137869; Office Action dated Jan. 30, 2004.
Chinese Patent Application No. 03101512.3 Office Action dated Dec. 12, 2004 and its translation (7 pages).
Patent Abstracts of Japan; Publication No. 08-283976; Date of Publication Oct. 29, 1996; 2 pages.
Notice of Rejection dated Apr. 4, 2005 for Patent Appl. No. 007600/2002; 3 pages.

* cited by examiner

*Primary Examiner*—Edward M. Johnson
(74) *Attorney, Agent, or Firm*—Osha Liang L.L.P.

(57) ABSTRACT

A processing solution preparation and supply apparatus includes a dissolving preparation bath to which a material powder and ultrapure water are supplied. This dissolving preparation bath is connected to a substrate processing apparatus via a pipe, and a processing solution prepared from the material powder on-site is supplied to the processing apparatus. To reduce an increase in the microorganism concentration in the ultrapure water, this ultrapure water is circulated substantially constantly. This suppresses deterioration and concentration fluctuations of a processing solution for use in processing of a semiconductor substrate, when this processing solution is supplied to the use side. This also reduces particles and improves the economical efficiency.

6 Claims, 3 Drawing Sheets

PROCESSING SOLUTION PREPARATION AND SUPPLY METHOD AND APPARATUS

BACKGROUND OF THE INVENTION

1. Field of the Invention

The present invention relates to a processing solution preparation and supply method and apparatus and, more particularly, to a method of preparing a processing solution for use in processing of a substrate on which an element is to be formed, and supplying the prepared processing solution to the substrate processing step, and an apparatus for the method.

2. Related Background Art

Generally, to form elements on a substrate in, e.g., the fabrication process of a semiconductor device such as a memory or logic circuit or of a liquid crystal display, the fabrication process of a flat panel display, or the fabrication process of a multilayered printed circuit board, thin films such as an insulator layer, semiconductor layer, and conductor layer are first sequentially formed on the surface of the substrate.

Subsequently, after the uppermost one of these thin films is coated with a resist layer, exposure is performed using a photomask, and patterning is performed using a resist developer. The resist pattern obtained by the development is used as a protective film to pattern the underlying thin films by etching by using an etchant. After that, the resist remaining on the substrate surface is removed by a resist stripper.

Also, before and after these processes, fine particles, foreign matter, and the like sticking to the substrate surface are removed by a cleaner. These series of photolithography steps are repeated in accordance with the number of photomasks. So, large amounts of the processing solutions such as the developer, etchant, resist stripper, and cleaner are used.

On the other hand, metal wiring layers for connecting components in each element and interconnecting elements are formed on the substrate. Copper lines which will be used most often in the future are formed by plating. In this plating, a substrate is dipped (immersed) in a plating bath having a copper electrode which also replenishes copper ion, and electrodeposition is performed by circulating a copper plating solution as a processing solution.

The amounts of the processing solutions used in the photolithography and plating as described above have significantly increased with a recent increase in size and mass-production of substrates.

Of these processing solutions, the composition and concentration of each photolithography processing solution must be strictly controlled in order to obtain high resolution, high patterning accuracy and precision, high stability, and high yield in accordance with the corresponding processing step. In particular, with the recent increasing density of patterning, the patterning width is required to be decreased.

For example, line widths of 0.1 μm level, 1 μm level, and 10 μm level are desired for a semiconductor substrate, liquid crystal substrate, and multilayered printed circuit board, respectively. Furthermore, a small line width of 1 μm or less is demanded to incorporate a semiconductor circuit on a liquid crystal substrate by the low-temperature polysilicon TFT technology. To achieve this small line width, the concentration variation of the photolithography processing solution must be controlled to $\pm\frac{1}{1,000}$ or less of the target concentration.

In addition, to minimize patterning defects, a so-called particle content of the photolithography processing solution must be very small. For example, strict limitations are required by which the number of particles of 0.1 μm or more is 10 or less, or 1 or less in some cases, in 1 ml of the photolithography processing solution. Such particle control conditions similarly apply to the plating solution described above.

Conventionally, each processing solution is exclusively prepared by a processing solution manufacturer (to be referred to as a "supply side" hereinafter) by dissolving a material powder in pure water to prepare an undiluted solution, adjusting the concentration by diluting this undiluted solution, and filtering out particles by microfiltration. This processing solution is filled in a vessel and supplied to a substrate processing place (to be referred to as a "use side" hereinafter) such as a semiconductor fabrication plant, liquid crystal substrate fabrication plant, or multilayered printed circuit board fabrication plant.

This is so because the installation cost and operation cost increase if the processing solution is prepared by dissolving a solid material in the form of a crystal powder or grains and adjusting the composition and concentration on-site in the semiconductor fabrication plant, liquid crystal substrate fabrication plant, or the like.

Additionally, it is extremely difficult to well control handling of the material powder and the like, dilution of the undiluted solution, and the composition and concentration. Also, the solid material itself in the form of a powder or the like produces particles, so the use of the solid material is essentially disliked. This tendency is particularly notable if the solid material contains a metal. Under these circumstances, no processing solution is currently prepared from a solid material on-site in a semiconductor fabrication plant, liquid crystal substrate fabrication plant, or the like.

Furthermore, the concentration of, e.g., the photolithography processing solution largely changes in accordance with the type, application, or the like of the processing solution. On the supply side, the concentration is usually adjusted to 0.1 to 5 mass %.

More specifically, an aqueous oxalic acid solution used as an etchant for a transparent conductive film in the liquid crystal substrate fabrication process is most often an aqueous solution having an oxalic acid concentration of 3.5 mass %. An aqueous potassium hydroxide solution used as an STN developer in the liquid crystal substrate fabrication process is most often an aqueous solution having a potassium hydroxide concentration of 0.7 mass %.

Also, an aqueous sodium hydroxide solution used as a developer in the printed circuit board fabrication process is most often an aqueous solution having a sodium hydroxide concentration of 1.0 mass %. Furthermore, an aqueous sodium hydroxide solution used as a resist stripper in the printed circuit board fabrication process is most often an aqueous solution having a sodium hydroxide concentration of 5.0 mass %.

SUMMARY OF THE INVENTION

As described above, the amount of a processing solution to be prepared by the supply side largely increases in accordance with the dilution ratio. This often significantly increases the cost of preparation of a vessel for transporting a large amount of a processing solution to the use side, the cost of filling this vessel with the processing solution, and the cost of transportation. Consequently, these expenses account for a considerable ratio of the cost of the processing solution, and this increases the processing cost of a substrate.

In some cases, a high-concentration processing stock solution (undiluted solution) is prepared on the supply side, and this undiluted solution is diluted by pure water on the use side. However, before the processing solution or its stock solution prepared on the supply side is used on the use side, transportation and storage require a considerable period, and the processing solution or its stock solution deteriorates during this period.

Also, according to the findings of the present inventors, especially when a processing solution or stock solution is stored as it is left to stand, viable counts of viruses, bacteria, live bacteria, and the like may significantly increase. Consequently, excrements and dead bodies of these fungus bodies may increase the total organic carbon (TOC) concentration. These fungus bodies and TOC can be particle sources.

If a processing solution or undiluted solution in stock absorbs the atmospheric carbon dioxide gas or the like, the above-mentioned deterioration is readily induced. In addition, if the atmospheric oxygen is dissolved, the dissolved oxygen (DO) concentration in the solution increases. This increase in DO can have influence on the substrate processing and can raise the increase ratio of the aforementioned fungus bodies as well. These events are similarly brought about in pure water used to dilute an undiluted solution (a stock solution).

If the solubility of a solid material in water is small, a material once dissolved in a high-concentration undiluted solution may precipitate. This precipitated material can be a particle source and also makes appropriate concentration control difficult. For example, the solubility of oxalic acid as a transparent conductive film etchant in water is relatively small; the concentration of a commercially available high-concentration undiluted solution is at most about 6 mass %.

As described above, it is difficult to completely remove particles caused by the material powder. Also, variations in the processing solution concentration in particularly a mass-production plant leads to a large amount of defective products or the shutdown of the operation of the line. This may result in a serious loss.

The present invention has been made in consideration of the above situation, and has as its object to provide a processing solution preparation and supply method and apparatus which, when supplying to the use side a processing solution for use in the processing of a substrate such as a semiconductor substrate, liquid crystal substrate, display substrate, or multilayered printed circuit board on which an element is to be formed, can suppress deterioration and concentration fluctuations of the processing solution, can reduce particles, and can also improve the economical efficiency.

To achieve the above object, a processing solution preparation and supply method according to the present invention is a method of preparing a processing solution for use in processing of a substrate on which an element (including an element structure or some other microstructure) is to be formed, and supplying the processing solution to the step of processing the substrate, comprising the preparation step of preparing the processing solution by dissolving a solid material of the processing solution in pure water, and the supply step of supplying the processing solution to the substrate processing step via (through) a pipeline, wherein in the preparation step, the pure water is circulated or allowed to flow substantially constantly.

In the above method of the present invention, the processing solution is prepared by dissolving the solid material in the pure water in the preparation step. It is desirable to measure the concentration directly or indirectly and, on the basis of the measurement value, control the concentration within a predetermined concentration range. In the supply step, the processing solution prepared to have a desired composition and concentration is supplied to the substrate processing step through the pipeline. Accordingly, the processing solution can be supplied on-site whenever it is necessary in the substrate processing step. This obviates the need to store the processing solution for a considerable period.

In the preparation step, the pure water is not left to stand but is circulated or allowed to flow substantially constantly. This suppresses increases in, e.g., the concentration of microorganisms such as fungus bodies and TOC in the pure water and in the processing solution. More specifically, it is effective to continuously or intermittently circulate the pure water or allow the pure water to flow such that particularly the microorganism concentration, among other physical amounts required of the pure water or processing solution, is not more than 100 times its initial value (i.e., is 100 times its initial value or less).

As described above, it is highly likely that microorganisms such as fungus bodies directly become particle sources. Accordingly, the flow of particles to the use side can be effectively prevented by maintaining the microorganism concentration at a suitable control value. Of the other physical amounts of the pure water and the like, the rises in the TOC concentration and DO concentration are correlated with an increase in microorganisms such as live bacteria, so it is also useful to control these concentrations. However, control based on the microorganism concentration is more favorable since particles can be directly controlled with ease. The microorganism concentration can be measured not only with a generally used particle counter but also with, e.g., a TOC meter or DO meter by using the correlation described above.

Furthermore, the conductivity (i.e., resistivity) of pure water often exhibits a correlation with the impurity concentration in the pure water; if the conductivity increases, an impurity may be mixed in the substrate processing step. Therefore, this conductivity can also be used as a physical property control value from a viewpoint different from particles.

To control these physical amounts such as the microorganism concentration to predetermined values, it is possible to use, e.g., sampling measurement and control of the pure water or processing solution in an actual processing operation, or a method of predetermining pure water circulating conditions in initial make-up of bath or during a trial operation.

In the preparation step, a dissolution assistant which promotes or accelerates dissolution of the solid material in the pure water is preferably added to a mixture of the solid material and pure water. These mixing and addition can be performed in an arbitrary order.

As described previously, if the solubility of the solid material of the processing solution in the pure water is inconveniently small and a required processing solution concentration is high, a dissolution residue can be produced in the preparation step. When the dissolution assistant is added, however, dissolution of the solid material in the pure water is promoted or accelerated, and this prevents the production of a dissolution residue which produces particles and causes concentration variations. Even when the solubility of the solid material in the pure water is sufficiently large, the dissolution assistant is favorable because the dissolution rate is increased.

In addition to this dissolution assistant, or if this dissolution assistant is unnecessary, other additives may also be added.

More specifically, if the substrate processing step is the step of etching a stacked material on the substrate, the preparation step comprises preparing an etchant for the stacked material as the processing solution.

Especially when the stacked material is a transparent conductive film, the preparation step usefully comprises preparing a solution containing oxalic acid ion as the processing solution by using oxalic acid as the solid material. In this preparation, at least one of alkylbezenesulfonic acid, alkylbenzenesulfonate, perfluoroalkylsulfonic acid, and perfluoroalkylsulfonate is desirably added as the dissolution assistant to a mixture of the oxalic acid and the pure water. The dissolution assistant in this case not only promotes dissolution but can also function as the second main component of the etchant of the transparent conductive film, thereby improving the etching performance.

If the stacked material is a chromium-containing film, the preparation step usefully comprises preparing a solution containing ceric ion as the processing solution by using ceric nitrate ammonium as the solid material. In this preparation, perchloric acid and/or nitric acid is desirably added as the dissolution assistant to a mixture of the ceric nitrate ammonium and the pure water.

This prevents the production of a cerium hydroxide precipitation by hydrolysis, and extremely effectively accelerates dissolution. In addition, when cerium is the first main component in the chromium etchant, perchloric acid and/or nitric acid functions as the second main component, and this improves the etching performance.

If the substrate processing step is the step of developing a photoresist stacked on the substrate or the step of removing the photoresist, the preparation step comprises preparing a developer or stripper of the photoresist as the processing solution.

In the preparation step, it is particularly useful to prepare an alkali-based solution as the processing solution by using at least one compound selected from the group consisting of a hydroxide, carbonate, bicarbonate, phosphate, and silicate of an alkali metal, and an ammonium compound, particularly, tetramethylammoniumhydroxide (TMAH) as the solid material. These solid materials can be relatively easily dissolved in pure water, so it is not particularly necessary to use any dissolution assistant. However, to improve the performance of the developer or stripper, it is preferable to appropriately add a surfactant.

If the substrate processing step is the step of plating the substrate with a metal, the preparation step comprises preparing a plating solution of the metal as the processing solution. Especially when the metal to be plated is copper, the preparation step usefully comprises preparing a solution containing copper ion as the processing solution by using copper sulfate ($CuSO_4 \cdot 5H_2O$) as the solid material.

In this preparation, sulfuric acid is desirably added as the dissolution assistant to a mixture of the copper sulfate and the pure water. This prevents the production of a copper hydroxide precipitation by hydrolysis, and extremely effectively accelerates dissolution. Also, sulfuric acid itself is the main solvent component of the copper plating solution. It is also possible to appropriately add chlorine ion, chlorine-based ion, a brightener, and the like.

A processing solution preparation and supply apparatus according to the present invention effectively practices the processing solution preparation and supply method of the present invention. That is, this processing solution preparation and supply apparatus is an apparatus for preparing a processing solution for use in processing of a substrate on which an element is to be formed, and supplying the processing solution to an apparatus for processing the substrate, comprising a preparation bath to which a solid material of the processing solution and pure water are supplied, and in which the processing solution is prepared by dissolving the solid material in the pure water, a solid material supply unit which is connected to the preparation bath and stores the solid material, a pure water supply unit which is connected to the preparation bath, and in which the pure water is circulated or allowed to flow substantially constantly, and a pipeline which is connected to the preparation bath and the substrate processing apparatus, and through which the processing solution is supplied from the preparation bath to the substrate processing apparatus.

Alternatively, in the pure water supply unit, the pure water is continuously or intermittently circulated or allowed to flow such that a microorganism concentration in the pure water or the processing solution is not more than 100 times its initial value (is 100 times its initial value or less).

DESCRIPTION OF THE PREFERRED EMBODIMENTS

Figure 1:
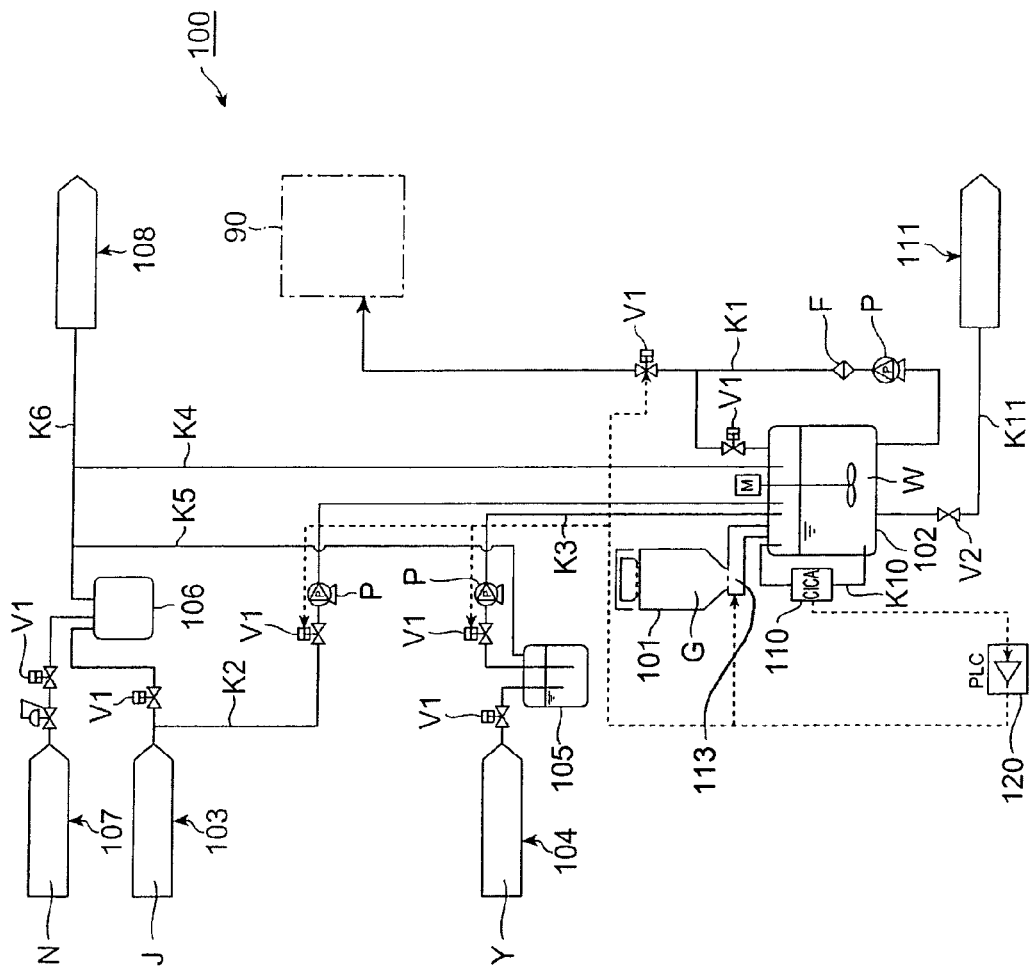
FIG. 1 is a schematic view showing an outline of the first embodiment of a processing solution preparation and supply apparatus according to the present invention.

Embodiments of the present invention will be described in detail below. The same reference numerals denote the same parts, and a repetitive explanation thereof will be omitted. Positional relationships are based on those shown in the drawings unless otherwise specified. Dimensional ratios are not restricted to those shown in the drawings.

A processing solution preparation and supply apparatus 100 shown in FIG. 1 includes a dissolving preparation bath 102 (preparation bath) connected to a processing apparatus 90 for processing a substrate, such as a semiconductor substrate, liquid crystal substrate, or printed circuit board, via a pipe K1 (pipeline). To this dissolving preparation bath 102, a material supply bath 101 (solid material supply unit) storing a material powder G (solid material) as the first main component of a processing solution W is connected. Also, an ultrapure water supply system 103 (pure water supply unit) and dissolution assistant supply system 104 (dissolution assistant supply unit) are connected to the dissolving preparation bath 102 via pipes K2 and K3, respectively.

The material supply bath 101 is place above the dissolving preparation bath 102. The material powder G is charged into this dissolving preparation bath 102 from a hopper on the bottom by using a screw feeder 113 or the like.

The ultrapure water supply system 103 has an apparatus (not shown) for generating so-called ultrapure water J whose ion concentration, particle concentration, and the like are properly controlled. The dissolution assistant supply system 104 stores or receives a dissolution assistant Y which promotes or accelerates dissolution of the material powder G into the ultrapure water J. This dissolution assistant Y is properly selected in accordance with the type of the material powder G. Depending on the processing solution W, the dissolution assistant Y can also function as the second main component which improves the original processing performance of the processing solution W.

The dissolving preparation bath 102 incorporates a stirrer M having an axial flow propeller or the like. A circulation pipe K10 having a densitometer 110 is placed outside this dissolving preparation bath 102. The densitometer 110 measures the component concentration in the processing solution W prepared in the dissolving preparation bath 102. As this densitometer 110, it is possible to use various measurement instruments such as a conductivity meter, absorptiometer, refractometer, viscometer, ultrasonic densitometer, liquid densitometer, and automatic titration device.

A controller 120 is connected to the densitometer 110. This controller 120 outputs an instruction signal, which corresponds to a signal indicating the component concentration in the processing solution W from the densitometer 110, to the material supply bath 101 and a flow control valve V1 (to be described later), thereby adjusting the supply amounts of the material powder G, ultrapure water J, and dissolution assistant Y to the dissolving preparation bath 102, and the supply amount of the processing solution W to the processing apparatus 90.

The dissolving preparation bath 102 is connected to a drain system 111 via a pipe K11. Furthermore, the dissolving preparation bath 102 and an assistant storage bath 105 are coupled with sealing pipes K4 and K5, respectively, connected to a wetting bath 106. This wetting bath 106 is connected to the ultrapure water supply system 103 described above and a seal gas supply system 107.

In the wetting bath 106, nitrogen gas N from the seal gas supply system 107 is supplied to the ultrapure water J to produce humid nitrogen gas N. This humid nitrogen gas N seals the dissolving preparation bath 102, the assistant storage bath 105, and the pipes connected to these baths.

An exhaust pipe K6 connected to an off-gas system 108 branches from the sealing pipes K4 and K5. Note that the flow control valve V1, an on-off valve V2, and a pump P are properly installed in each pipe as needed. The pipe K1 further has a filter F for removing particles.

An example of a processing solution preparation and supply method according to the present invention using the processing solution preparation and supply apparatus 100 constructed as above will be explained below. In each processing step described below, the temperature is appropriately controlled where necessary.

First, predetermined amounts of the ultrapure water J and nitrogen gas N are supplied to the wetting bath 106 to produce humid nitrogen gas N, and the dissolving preparation bath 102 and assistant storage bath 105 are sealed by this humid nitrogen gas N. This prevents the processing solution W prepared in the dissolving preparation bath 102 and the dissolution assistant Y in the form of a liquid from absorbing the atmospheric oxygen gas, carbon dioxide gas, ammonia gas, and the like.

Subsequently, predetermined amounts of the ultrapure water J and material powder G are supplied to the dissolving preparation bath 102 and mixed by stirring by the stirrer M, thereby dissolving the material powder G to prepare the processing solution W. If the solubility of the material powder G in the ultrapure water J is small, the dissolution assistant Y is added to the dissolving preparation bath 102 as needed.

In this case, the processing solution W is circulated in the circulation pipe K10, and the component concentration in this processing solution W is monitored by the densitometer 110. More specifically, when this densitometer 110 is an absorptiometer or conductivity meter, for example, a detection signal corresponding to the absorbance or conductivity of the processing solution W is continuously or intermittently output to the controller 120 whenever the processing solution W passes by the densitometer 110.

Data (e.g., a correlation coefficient or calibration curve) indicating the correlation between the detection signal intensity and component concentration is input to or stored in an arithmetic unit (not shown) of the controller 120 beforehand. From the measured detection signal intensity, the measurement value of the component concentration in the dissolving preparation bath 102 is calculated.

Also, a target set value of the component concentration is input to or stored in the arithmetic unit beforehand, and a difference between the measurement value and target value of the component concentration is calculated. In accordance with this difference, a control signal for adjusting the supply of the material powder G, dissolution assistant Y, and ultrapure water J is output to each flow control valve V1 and each pump P. This component concentration control operation is continuously or intermittently performed to adjust the component concentration in the processing solution W to a desired value (preparation step).

As the material powder G, a solid material of the processing solution W corresponding to the type of processing of a substrate performed in the processing apparatus 90 can be used. For example, if the processing apparatus 90 performs a wet etching process in the fabrication of semiconductor elements or the like, the processing solution W is an etchant for the wet etching.

More specifically, if an object of the etching is a transparent conductive film such as a thin indium tin oxide (ITO) film, an oxalic acid powder is used as the material powder G, and an oxalic acid solution is prepared as the processing solution W in the dissolving preparation bath 102. The oxalic acid concentration in this processing solution W is preferably 1 to 6 mass % and, more preferably, 3.3 to 3.6 mass %.

In this case, at least one of alkylbenzenesulfonic acid, alkylbenzenesulfonate perfluoroalkylsulfonic acid, and perfluoroalkylsulfonate can be used as the dissolution assistant Y. The solubility of oxalic acid in water is relatively small, so oxalic acid is generally supplied as an undiluted solution (a stock solution) having an oxalic acid concentration of about 6 mass %. To prepare an oxalic acid solution on-site in the dissolving preparation bath 102, therefore, the use of the dissolution assistant Y together with the temperature control can advantageously suppress the dissolution residue and increase the preparation rate.

The addition amount of the dissolution assistant Y depends on its type. However, this addition amount is preferably 0.1 to 3 parts by mass and, more preferably, 0.3 to 1 part by mass with respect to 100 parts by mass of oxalic acid.

If an object of the etching is a chromium film or chromium-containing film, a compound containing cerium as an oxidation factor, particularly a ceric nitrate ammonium powder is used as the material powder G, and a ceric nitrate ammonium solution is prepared as the processing solution W in the dissolving preparation bath 102. The ceric nitrate ammonium concentration in this processing solution W is preferably 10 to 20 mass % and, more preferably, 14 to 18 mass %.

In this case, an acid such as perchloric acid or nitric acid can be used as the dissolution assistant Y. Although the addition amount of this dissolution assistant Y depends on its type, this addition amount is preferably 5 to 20 parts by mass and, more preferably, 10 to 15 parts by mass with respect to 100 parts by mass of ceric nitrate ammonium as the material powder G.

In the processing solution W as a chromium etchant, cerium is the first main component, and the acid such as perchloric acid or nitric acid is the dissolution assistant and also functions as the second main component.

Furthermore, if the processing apparatus 90 performs a developing process, or a stripping process after that, of a photoresist used in photolithography in the fabrication of semiconductor elements or the like, the processing solution W is a developer or stripper for the process.

In microprocessing or micromachining, various types of photoresists are used in accordance with the purposes or conditions. Examples are a positive photoresist, negative photoresist, i-line photoresist, KrF excimer laser photoresist, and ArF excimer laser photoresist. A variety of materials of these photoresists are also used. Examples are a DQN resist formed by mixing a diazoquinone (DQ)-based photosensitive agent in a Novolac (N) resin as a matrix material, a photoacid generator-containing resist, and a chemical amplification resist.

More specifically, an alkali-based processing solution is extensively used in, e.g., the development of particularly a positive photoresist among other photoresists. For processing like this, therefore, it is favorable to use at least one compound, i.e., at least one alkali agent, selected from a hydroxide, carbonate, bicarbonate, phosphate, and silicate of an alkali metal and an ammonium compound (including a substituted or nonsubstituted alkylammonium compound) as the material powder G, and prepare an alkali-based developer or the like as the processing solution W in the dissolving preparation bath 102.

Of these compounds, the alkali metal salt is more preferably a salt or hydroxide of potassium or sodium and, most preferably, potassium hydroxide. Examples of the ammonium compound are TMAH and trimethylmonoethanolammoniumhydroxide (choline), and TMAH is more desirable.

The ammonium compound is useful in that it can eliminate contamination by an alkali metal. In particular, TMAH which is strongly alkaline is advantageous in improving the development performance and reducing the use amount.

The concentration of this alkali component material is preferably 0.1 to 2.5 mass % and, more preferably, 0.1 to 2.4 mass %. In this preferred range, concentration control can be appropriately performed in accordance with the type of photoresist and/or alkali as an object.

As an example, a photoresist processing solution W used in the fabrication of semiconductor elements (devices) or the like is useful if the alkali component (e.g., TMAH) is preferably 2.2 to 2.4 mass % (more specifically, 2.375 to 2.385 mass %) and, more preferably, 2.3 to 2.4 mass % (more specifically, 2.377 to 2.383 mass %).

For a photoresist (e.g., a DQN resist) used in the fabrication of a liquid crystal device, a useful alkali component is preferably 2.2 to 2.4 mass % (more specifically, 2.370 to 2.390 mass %) and, more preferably, 2.3 to 2.4 mass % (more specifically, 2.375 to 2.385 mass %). For an acryl-based resist, a useful alkali component is preferably 0.1 to 0.6 mass %.

If the processing apparatus 90 performs a metal plating process in the fabrication of semiconductor elements or the like, the processing solution W is a plating solution for the process. Recently, a wiring metal is changing from aluminum to copper, and the form of processing most often used is a damascene process. Since there is no useful CVD source for this copper wiring, films are generally formed by plating electrodeposition. For copper plating, therefore, it is favorable to use a copper sulfate powder as the material powder G and prepare a copper sulfate solution as the processing solution W in the dissolving preparation bath 102. The copper sulfate ($CuSO_4.5H_2O$) concentration in this processing solution W is preferably 60 to 90 g/l and, more preferably, 66 to 75 g/l.

In this case, sulfuric acid can be used as the dissolution assistant Y. Although the addition amount of this dissolution assistant Y depends on its type, this addition amount is preferably 140 to 240 g/l and, more preferably, 170 to 190 g/l. It is also possible to add other additives. Examples are an accelerator which accelerates bottom up fill of holes and trenches formed in the substrate, a planarizing agent (an over-plating inhibitor) which accelerates planarization of field film formation, chlorine ion, chlorine-based ion, and a brightener.

Generally, the ultrapure water J can be any ultrapure water used in the fabrication of, e.g., semiconductor devices, liquid crystal devices, electronic circuits, and multilayered printed wiring, and is readily available. Since an ultrapure water manufacturing apparatus is usually installed in these processing facilities, this ultrapure water manufacturing apparatus can also be used as the ultrapure water supply system 103 of the processing solution preparation and supply apparatus 100.

When the processing solution W is prepared in the present invention, the ultrapure water J is circulated or allowed to flow substantially constantly. More specifically, the ultrapure water J is continuously or intermittently circulated or allowed to flow so that the microorganism concentration in this ultrapure water J or in the processing solution W is preferably 100 times the initial value or less and, more preferably, 50 times the initial value or less, and particularly favorably this microorganism concentration is maintained substantially the same as the initial value.

As a means for this purpose, the ultrapure water J is allowed to flow into the dissolving preparation bath 102. In this case, in order that the component concentration in the processing solution W in this dissolving preparation bath 102 be held constant, the supply of the material powder G and dissolution assistant Y is controlled by the concentration obtained by the densitometer 110 and controller 120 described earlier.

Alternatively, a bypass pipe or drain pipe may be connected to the ultrapure water supply system 103 or pipe K2 to allow the ultrapure water J to flow to the outside of the dissolving preparation bath 102 constantly or substantially constantly. It is also possible to permit the ultrapure water J to flow inside and outside the ultrapure water supply system 103 by circulation or the like so that this ultrapure water J stays as little as possible.

For example, the following method can be used as a method of circulating the ultrapure water J so that the microorganism concentration is 100 times the initial value or less. That is, when an actual operation for the processing solution W is to be performed, the ultrapure water J or processing solution W in the system is obtained by sampling or the like at any time to measure the physical amount, as in the component concentration control described previously. The flow rate and frequency of supply of the ultrapure water J to the inside and outside of the dissolving preparation bath 102 are controlled by feedback, so that this physical amount is equal to or smaller than a control target value.

Alternatively, when the dissolving preparation bath 102 is initially made up, i.e., when the apparatus is started up or operated as a trial before an actual operation, the relationships between the supply amount and supply frequency of the ultrapure water J and the aforementioned physical amount in the ultrapure water J or processing solution W are acquired beforehand. In accordance with the operation form of the preparation step of the processing solution W, an actual operation is performed by the supply amount and supply frequency of the ultrapure water J with which the microorganism concentration is 100 times the initial value or less. The latter method is presumably desirable when the influence on and the convenience of the processing apparatus 90 are taken into account.

As described above, the processing apparatus 90 is generally required to meet the very strict limitation that the number of particles of 0.1 μm or more is 10 or less or 1 or less in 1 ml of the processing solution W. In addition, of microorganisms, the representative size of live bacteria is about 4 to 5 μm, the representative size of bacteria is about 1 μm, and the representative size of viruses, spores, and live bacterium fragments is about 0.1 μm.

When these are taken into consideration, as a practical control value example of the microorganism concentration in the ultrapure water J or processing solution W, e.g., as the number of live bacteria, the initial value is preferably $10^{-2}$ bacteria/ml order or less, and the control value is preferably one bacterium/ml order or less. More preferably, the initial value is $10^{-3}$ bacteria/ml order or less, and the control value is $10^{-1}$ bacteria/ml order or less.

A control item candidate other than the microorganism concentration of the ultrapure water J or processing solution W is the TOC concentration or DO concentration of the ultrapure water J or processing solution W, or the conductivity of the ultrapure water J. As described earlier, the microorganism concentration is the direct principal cause of particles, and the two factors often increase as series. In contrast, the DO concentration and TOC concentration often increase linearly, although they have a correlation with the microorganism concentration.

The dissolved amount of TOC changes in accordance with, e.g., the material of a pipe in addition to the contribution of dead bodies of fungus bodies or the like. The initial value of the TOC concentration in the ultrapure water J is, e.g., about 10 to 100 μg/l, and the increase ratio also depends on the pipe material and the like in some cases. These values have a correlation with the microorganism concentration. Particularly a solid component can be a particle source, so it is also useful to control the solid component. If this TOC concentration becomes larger than twice the initial value, an increase in particles in the processing solution W is affected. In some instances, the microorganism concentration may excessively rise.

Furthermore, if the increase ratio of microorganisms in water in a stationary state significantly changes owing to the DO concentration and this DO concentration linearly increases, the microorganism concentration can increase as series (exponentially). Accordingly, the initial value of the DO concentration in the ultrapure water J is desirably set by degassing to preferably 1 mg/l order or less, more preferably, 0.1 mg/l order or less and, most preferably, 0.01 mg/l or less.

Since the DO concentration in the processing solution W may have an adverse effect on, e.g., the step of forming films on a substrate, control of this DO concentration is also desirably in this respect. If the DO concentration becomes larger than twice the initial value, the increase ratio of the number of fungus bodies such as live bacteria increases. This makes it difficult to well reduce particles.

On the other hand, the conductivity is often increased by increases in, e.g., chlorine ion, metal ion, and carbonate ion in the ultrapure water J. Control of the conductivity of the ultrapure water J is desirable from a viewpoint different from the suppression of particles and the like.

Generally, the resistivity is in many cases controlled instead of the conductivity. That is, a decrease in resistivity (increase in conductivity) may increase the probability of mixing of impurities in the substrate processing step. At 25° C., the initial value of the resistivity of the ultrapure water J is preferably about 20 M Ω·cm or more and, more preferably, about 50 M Ω·cm order or more. If this resistivity is less than twice the initial value (in other words, if the conductivity is more than twice the initial value), impurity mixing may have significant influence on the device characteristics of semiconductor elements or the like.

The processing solution W adjusted to have the desired composition and concentration as described above is supplied to the pipe K1. After particles are further removed by the filter F, this processing solution W is supplied to the processing apparatus 90 through the pipe K1 (supply step). It is preferable to perform, or assist the supply of the processing solution W to the processing apparatus 90 by using a head pressure difference by adjusting the applied pressure of the humid nitrogen gas N for sealing the dissolving preparation bath 102. This is so because the energy consumption amount and pulsation can be reduced.

To extract the processing solution W from the dissolving preparation bath 102 in initial make-up of the bath, in inspection, or in case of emergency, the processing solution W is discharged to the drain system 111 through the pipe K11.

In the processing solution preparation and supply apparatus 100 constructed as above and the processing solution preparation and supply method using the apparatus, in the preparation step, the processing solution W is obtained by dissolving the material powder G in the ultrapure water J in the dissolving preparation bath 102. In the supply step, this processing solution W is supplied to the processing apparatus 90 through the pipe K1 without being stored for a predetermined period or exposed to the atmosphere.

Accordingly, the processing solution W can be supplied on-site when a substrate such as a semiconductor substrate or liquid crystal substrate must be processed. This solves the conventional problem that the processing solution W deteriorates or increases its DO by absorbing the atmospheric oxygen gas or carbon dioxide gas during storage. Consequently, it is possible to suppress increases in the number of microorganisms and TOC in the processing solution W and reduce particles caused by these factors.

In the preparation step, the ultrapure water J is not left to stand but circulated or allowed to flow substantially constantly. More specifically, control is so performed that the microorganism concentration in the ultrapure water J or processing solution W is 100 times the initial value or less. This makes it possible to more effectively prevent mixing of particles into the processing apparatus 90.

Figure 2:
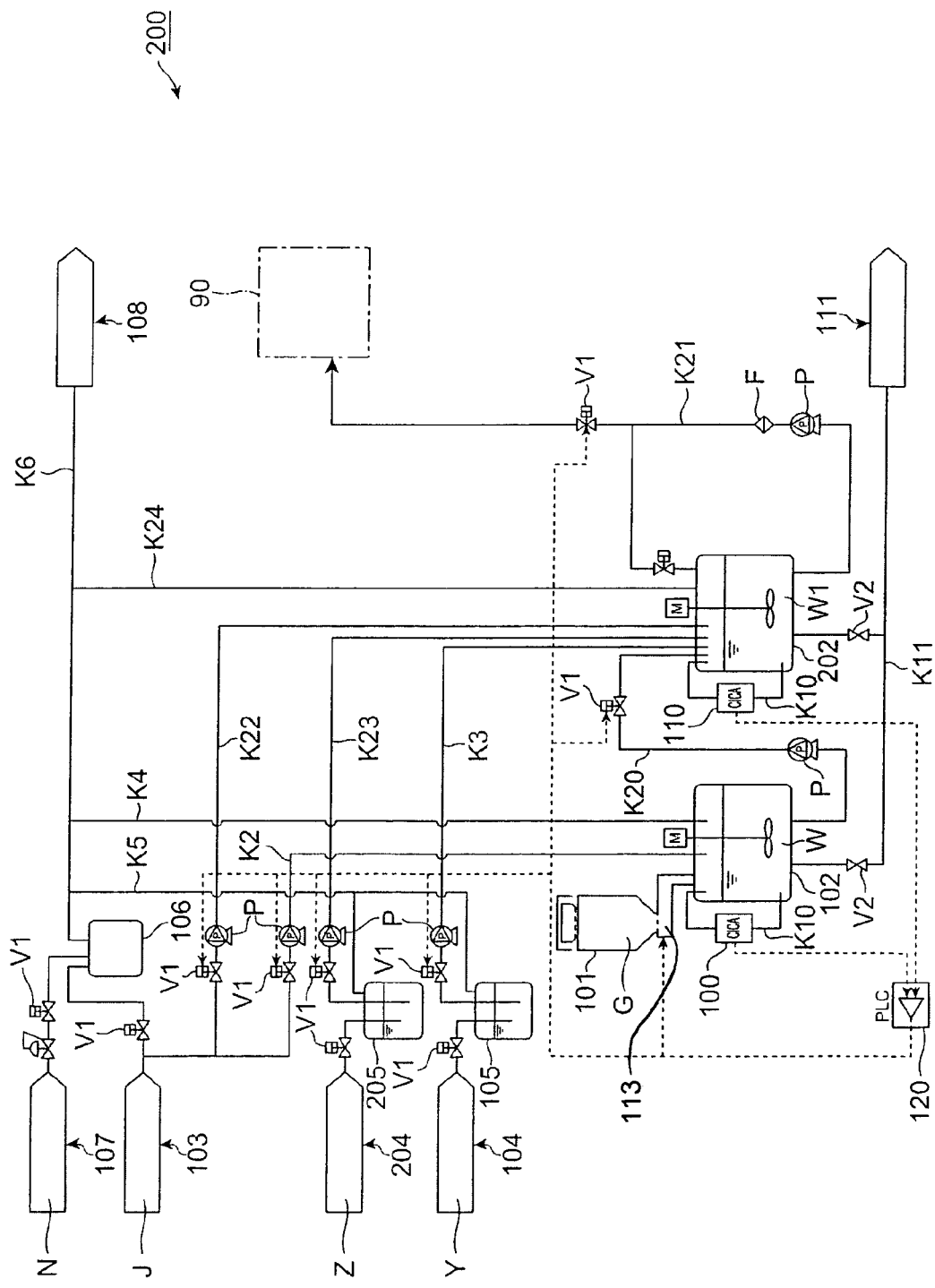
FIG. 2 is a schematic view showing an outline of the second embodiment of the processing solution preparation and supply apparatus according to the present invention.

A processing solution preparation and supply apparatus 200 shown in FIG. 2 has substantially the same arrangement as the processing solution preparation and supply apparatus 100 shown in FIG. 1, except that an adjustment bath 202 connected to a processing apparatus 90 is placed after a dissolving preparation bath 102, and an additive supply system 204 is connected to this adjustment bath 202 via an additive storage bath 205 and pipe K23.

The adjustment bath 202 and additive storage bath 205 are connected to a sealing pipe K24 and a branched pipe of a sealing pipe K5, respectively, connected to a wetting bath 106, and are sealed by humid nitrogen gas N similar to the dissolving preparation bath 102. In addition, an ultrapure water supply system 103 is connected to the adjustment bath 202 via a pipe K22. A preparation bath is thus constructed by the dissolving preparation bath 102, the adjustment bath 202, and a pipe K20.

In this processing solution preparation and supply apparatus 200, a processing solution W prepared in the dissolving preparation bath 102 is naturally transferred to the adjustment bath 202 through the pipe K20 by using a head pressure difference. A dissolution assistant supply system 104 is connected to the adjustment bath 202 and adds a dissolution assistant Y and additive Z to this adjustment bath 202, thereby preparing a processing solution W1 having controlled liquid properties and component concentration. This processing solution W1 is supplied to the processing apparatus 90 through a pipe K21. In this embodiment, it is possible to prepare a processing solution W having a concentration higher than a desired component concentration in the dissolving preparation bath 102, and further adjust the concentration by diluting this processing solution W in the adjustment bath 202.

As the additive Z, various additives can be used in accordance with the type and purpose of the processing solution W. For example, a surfactant can be used when the processing solution W is a photoresist developer. When the processing solution W is a copper plating solution, it is possible to further add an accelerator or planarizing agent described previously, or a suppresser (an inhibitor) or brightener. When the processing solution w is an ITO etchant, alkylbenzenesulfonic acid or the like can be used. This alkylbenzenesulfonic acid can also function as a dissolution assistant as described above.

Figure 3:
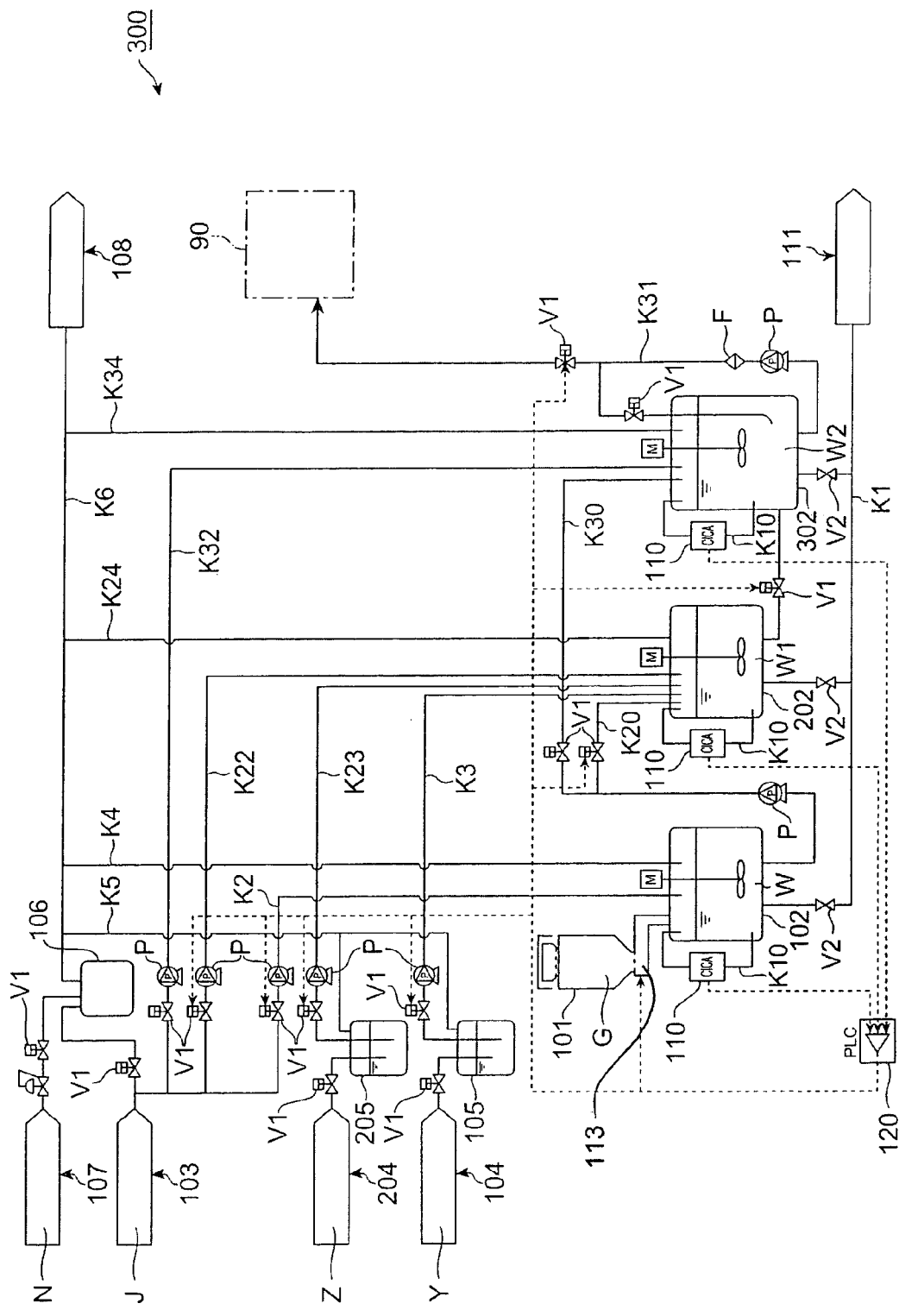
FIG. 3 is a schematic view showing an outline of the third embodiment of the processing solution preparation and supply apparatus according to the present invention.

A processing solution preparation and supply apparatus 300 shown in FIG. 3 has substantially the same arrangement as the processing solution preparation and supply apparatus 200 shown in FIG. 2, except that a leveling bath 302 connected to a processing apparatus 90 is placed after an adjustment bath 202.

This leveling bath 302 is connected to a dissolving preparation bath 102 and the adjustment bath 202 via pipes K30 and K40, respectively. The leveling bath 302 is also connected to a sealing pipe K34 connected to a wetting bath 106, and sealed by humid nitrogen gas N similar to the dissolving preparation bath 102 and adjustment bath 202. Furthermore, this leveling bath 302 is connected to an ultrapure water supply system 103 via a pipe K32. A preparation bath is thus constructed by the dissolving preparation bath 102, the adjustment bath 202, the leveling bath 302, a pipe K20, and the pipe K30.

In this processing solution preparation and supply apparatus 300, a processing solution W prepared in the dissolving preparation bath 102 is naturally transferred to the adjustment bath 202 and leveling bath 302 through the pipes K20 and K30 by using a head pressure difference, and a processing solution W1 in the adjustment bath 202 is naturally transferred to the leveling bath 302 through the pipe K40. In this embodiment, the processing solution W1 adjusted to have a target component concentration in the adjustment bath 202 is further subjected to concentration leveling in the leveling bath 302 to obtain the processing solution W2. This reduces a slight concentration error inevitably produced during preparation or adjustment.

In the processing solution preparation and supply apparatuses 200 and 300 constructed as above and the processing solution preparation and supply methods of the present invention using these apparatuses, the same functions and effects as achieved by the processing solution preparation and supply apparatus 100 described above can be obtained. However, a detailed explanation thereof will be omitted to omit a repetitive explanation. In addition, the processing solution W can be supplied to the processing apparatus 90 more easily by the use of the adjustment bath 202 and leveling bath 302. Furthermore, the component concentration in the processing solution W to be supplied can be maintained more stably and accurately than when this processing solution W is supplied in a batch manner.

The present invention is not limited to the aforementioned embodiments. For example, the densitometer 110 desirably has a temperature compensating function. Alternatively, the controller 120 can have this temperature compensating function of correcting the detection signal intensity on the basis of the measured temperature.

Also, manual control can be performed instead of automatic control using the controller 120. Degassing (removal of dissolved gases) of the ultrapure water J and/or the processing solutions W, W1, and W2 described above can also be performed. Furthermore, to calculate the component concentrations in the processing solutions W, W1, and W2, a level gage, volume meter, or weight meter can be installed in each of the dissolving preparation bath 102, adjustment bath 202, and leveling bath 302 in order to measure the solution amounts in these baths.

The densitometer 110 is installed together with the circulation pipe K10 outside the dissolving preparation bath 102 and the like. However, a sensor unit, electrode unit, or the like may also be brought into direct contact with the processing solutions W, W1, and W2 in the baths.

It is also possible to mix the ultrapure water J and the dissolution assistant Y in the form of a liquid or the additive Z by a line mixer, and supply the mixture to the dissolving preparation bath 102, adjustment bath 202, or leveling bath 302. Additionally, the processing solution W and the like may also be stirred by jet stirring, not by the stirrer M.

Furthermore, it is only necessary to control the supply amount of at least one of the material powder G and ultrapure water J. For example, the supply amount of the ultrapure water J may be controlled while the supply amount of the material powder G is held constant.

The screw feeder 113 for supplying the material supply bath 101 can also be preferably constructed by a fixed-amount screw unit for performing most of fixed-amount supply, and a control screw unit for performing slight amount control. In this case, finer concentration control can be performed if the supply amount control of the material powder G, which is based on the component concentration in the processing solution W, is exclusively performed by the control screw. Likewise, the supply pump P of each of the ultrapure water J, dissolution assistant Y, and additive Z may be constructed by two types of pumps.

As has been described above, the present invention obviates the need to prepare on the supply side an undiluted solution of a processing solution used in processing of a substrate, e.g., a semiconductor substrate, liquid crystal substrate, display substrate, or multilayered printed circuit board, on which an element (element structure) is to be formed, and to store and dilute this processing solution on the use side as a substrate processing installation, and makes it possible to prepare and supply the processing solution on-site as needed.

In addition, pure water is circulated or allowed to flow at a predetermined flow rate, frequency, and the like. When the processing solution is supplied to the use side, therefore, deterioration of the processing solution and fluctuations in the component concentration can be well suppressed. It is also possible to reduce particles and improve the economical efficiency.

What is claimed is:

1. A processing solution preparation and supply apparatus for preparing a processing solution for use in processing of a substrate on which an element is to be formed, and supplying said processing solution to an apparatus for processing said substrate, comprising:
   a preparation bath to which a solid material powder of said processing solution and pure water are supplied, and in which said processing solution is prepared by dissolving said solid material powder in said pure water;
   a solid material supply unit which is connected to said preparation bath and stores said solid material powder;
   a pure water supply unit which is connected to said preparation bath, and in which said pure water is circulated or allowed to flow substantially constantly;
   a pipeline which is connected to said preparation bath and a substrate processing apparatus, and through which said processing solution is supplied from said preparation bath to said substrate processing apparatus; and
   a dissolution assistant supply unit which is connected to said preparation bath and stores a dissolution assistant for promoting dissolution of said solid material powder in said pure water.

2. A processing solution preparation and supply apparatus for preparing a processing solution for use in processing of a substrate on which an element is to be formed, and supplying said processing solution to an apparatus for processing said substrate, comprising:
   a preparation bath to which a solid material powder of said processing solution and pure water are supplied, and in which said processing solution is prepared by dissolving said solid material powder in said pure water;
   a solid material powder supply unit which is connected to said preparation bath and stores said solid material powder;
   a pure water supply unit connected to said preparation bath;
   a pipeline which is connected to said preparation bath and a substrate processing apparatus, and through which said processing solution is supplied from said preparation bath to said substrate processing apparatus, wherein in said pure water supply unit, said pure water is continuously or intermittently circulated or allowed to flow such that a microorganism concentration in said pure water or said processing solution is not more than 100 times an initial value of said microorganism concentration; and
   a dissolution assistant supply unit which is connected to said preparation bath and stores a dissolution assistant for promoting dissolution of said solid material power in said pure water.

3. The apparatus according to claim 1, wherein the processing of the substrate is etching a stacked material on the substrate, wherein a solution containing oxalic acid ion is prepared as said processing solution by using oxalic acid as said solid material powder, and wherein the stacked material to be etched is a transparent conductive film.

4. The apparatus according to claim 1, wherein the processing of the substrate is etching a stacked material on the substrate, wherein a solution containing ceric ion is prepared as said processing solution by using ceric nitrate ammonium as said solid material powder, and wherein the stacked material to be etched is a chromium-containing film.

5. The apparatus according to claim 1, wherein the processing of the substrate is developing a photoresist stacked on said substrate or stripping a photoresist stacked on said substrate, wherein the solid material powder comprises at least one compound selected from a group consisting of a hydroxide, carbonate, bicarbonate, phosphate, and silicate of an alkali metal, and tetramethylammoniumhydroxide, in order to prepare an alkali-based solution as said processing solution.

6. The apparatus according to claim 1, wherein the processing of the substrate is plating said substrate with a metal, wherein a solution containing copper ion is prepared as said processing solution by using copper sulfate as said solid material powder, and wherein the metal for plating said substrate is copper.

* * * * *